United States Patent
Law et al.

(10) Patent No.: US 11,417,128 B2
(45) Date of Patent: Aug. 16, 2022

(54) METHOD, DEVICE, AND SYSTEM FOR ADAPTIVE TRAINING OF MACHINE LEARNING MODELS VIA DETECTED IN-FIELD CONTEXTUAL INCIDENT TIMELINE ENTRY AND ASSOCIATED LOCATED AND RETRIEVED DIGITAL AUDIO AND/OR VIDEO IMAGING

(71) Applicant: MOTOROLA SOLUTIONS, INC, Chicago, IL (US)

(72) Inventors: Daniel A. Law, Glencoe, IL (US); Jehan Wickramasuriya, St. Charles, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 721 days.

(21) Appl. No.: 15/851,760

(22) Filed: Dec. 22, 2017

(65) Prior Publication Data
US 2019/0197369 A1    Jun. 27, 2019

(51) Int. Cl.
G06V 30/194 (2022.01)
H04N 5/247 (2006.01)
G06N 3/04 (2006.01)
G06N 3/08 (2006.01)
(Continued)

(52) U.S. Cl.
CPC ......... *G06V 30/194* (2022.01); *G06K 9/6262* (2013.01); *G06N 3/04* (2013.01);
(Continued)

(58) Field of Classification Search
CPC .. G06K 9/66; G06N 3/08; G06N 3/04; H04N 5/247
(Continued)

(56) References Cited

U.S. PATENT DOCUMENTS 6,502,082 B1   12/2002   Toyama et al.
6,842,877 B2   1/2005    Robarts et al.
(Continued)

FOREIGN PATENT DOCUMENTS

WO   2011025460 A1   3/2011

OTHER PUBLICATIONS

The International Search Report and the Written Opinion corresponding serial No. PCT/US2018/060890 filed Nov. 14, 2018, dated Jan. 21, 2019, all pages.

*Primary Examiner* — Jerome Grant, II
(74) *Attorney, Agent, or Firm* — Daniel R Bester

(57) ABSTRACT

Receive first context information (FCI) including entered in-field incident timeline information values from an in-field incident timeline application and a time associated with an entry of the FCI values. Access a mapping that maps in-field incident timeline information values to events having a pre-determined threshold confidence of occurring and identify an event associated with the received FCI. Determine a location associated with the entry of the FCI and a time period associated with the entry of the FCI. Access a camera location database and identify cameras that have a field of view including the location during the time period. Retrieve audio and/or video streams captured by the cameras during the time period. And provide the audio and/or video streams to machine learning training modules corresponding to machine learning models for detecting the event in and/or video streams for further training of the machine learning models.

20 Claims, 6 Drawing Sheets

(51) Int. Cl.
*G06K 9/62* (2022.01)
*H04N 7/18* (2006.01)
*G06V 20/00* (2022.01)
*G06V 20/13* (2022.01)
*G06V 20/52* (2022.01)
*G06N 5/00* (2006.01)
*G06N 20/10* (2019.01)

(52) U.S. Cl.
CPC ............... *G06N 3/08* (2013.01); *G06N 3/082* (2013.01); *G06V 20/00* (2022.01); *G06V 20/13* (2022.01); *G06V 20/52* (2022.01); *H04N 5/247* (2013.01); *H04N 7/181* (2013.01); *G06N 5/003* (2013.01); *G06N 20/10* (2019.01)

(58) Field of Classification Search
USPC .......................................................... 382/157
See application file for complete search history.

(56) References Cited

U.S. PATENT DOCUMENTS

| | | | |
|---|---|---|---|
| 7,054,847 B2 | 5/2006 | Hartman et al. | |
| 7,203,635 B2 | 4/2007 | Oliver et al. | |
| 7,519,564 B2 | 4/2009 | Horvitz | |
| 9,501,915 B1* | 11/2016 | Laska | H04N 7/181 |
| 9,809,159 B1* | 11/2017 | Snyder | B60T 17/22 |
| 10,140,827 B2* | 11/2018 | Laska | G08B 13/1961 |
| 10,438,085 B2* | 10/2019 | Chu | G06V 40/10 |
| 10,957,171 B2* | 3/2021 | Heitz, III | G06V 40/20 |
| 11,049,298 B2* | 6/2021 | Waniguchi | G08B 25/14 |
| 2015/0264258 A1* | 9/2015 | Bervoets | H04N 5/23238 348/36 |
| 2017/0075721 A1* | 3/2017 | Bishop | G06F 9/4881 |
| 2017/0238055 A1 | 8/2017 | Chang et al. | |
| 2017/0251911 A1* | 9/2017 | Ito | G02B 23/2438 |
| 2017/0277785 A1 | 9/2017 | Burke | |
| 2017/0278367 A1 | 9/2017 | Burke | |
| 2017/0372267 A1* | 12/2017 | Soffer | G06Q 10/1095 |
| 2018/0204124 A1* | 7/2018 | Howie | G06F 11/00 |
| 2018/0276343 A1* | 9/2018 | Curbera | G16H 40/20 |
| 2018/0316588 A1* | 11/2018 | Miernik | H04L 43/0888 |
| 2018/0336423 A1* | 11/2018 | Ban | G06K 9/00791 |
| 2019/0005812 A1* | 1/2019 | Matus | G08G 1/0133 |
| 2019/0034787 A1* | 1/2019 | Knittel | G06K 9/6267 |
| 2019/0274022 A1* | 9/2019 | Escobar K'David | H04W 4/80 |
| 2019/0348076 A1* | 11/2019 | Hershfield | H04N 7/181 |

* cited by examiner

METHOD, DEVICE, AND SYSTEM FOR ADAPTIVE TRAINING OF MACHINE LEARNING MODELS VIA DETECTED IN-FIELD CONTEXTUAL INCIDENT TIMELINE ENTRY AND ASSOCIATED LOCATED AND RETRIEVED DIGITAL AUDIO AND/OR VIDEO IMAGING

BACKGROUND OF THE INVENTION

Tablets, laptops, phones (e.g., cellular or satellite), mobile (vehicular) or portable (personal) two-way radios, and other communication devices are now in common use by users, such as first responders (including firemen, police officers, and paramedics, among others), and provide such users and others with instant access to increasingly valuable information and resources such as vehicle histories, arrest records, outstanding warrants, health information, real-time traffic or other situational status information, and any other information that may aid the user in making a more informed determination of an action to take or how to resolve a situation, among other possibilities.

In addition, video coverage of many major metropolitan areas is reaching a point of saturation such that nearly every square foot of some cities is under surveillance by at least one static or moving camera. Currently, some governmental public safety and enterprise security agencies are deploying government-owned and/or privately-owned cameras or are obtaining legal access to government-owned and/or privately-owned cameras, or some combination thereof, and are deploying command centers to monitor these cameras. Additionally, such command centers may implement machine learning models to automatically detect certain events or situations in real-time video and/or audio streams and/or in previously captured video and/or audio streams generated from the monitored cameras.

However, as the number of audio and/or video streams increases, and the number of events to be detected and number of corresponding machine learning models involved correspondingly increases, it becomes difficult and time-consuming to train, update, and verify correct output of such models with respect to new situations, new actions, new types of cameras, new lighting situations, and other parameters, such that the increased value of such audio and/or video monitoring and the ability to identify situations of concern via machine learning models decreases substantially.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
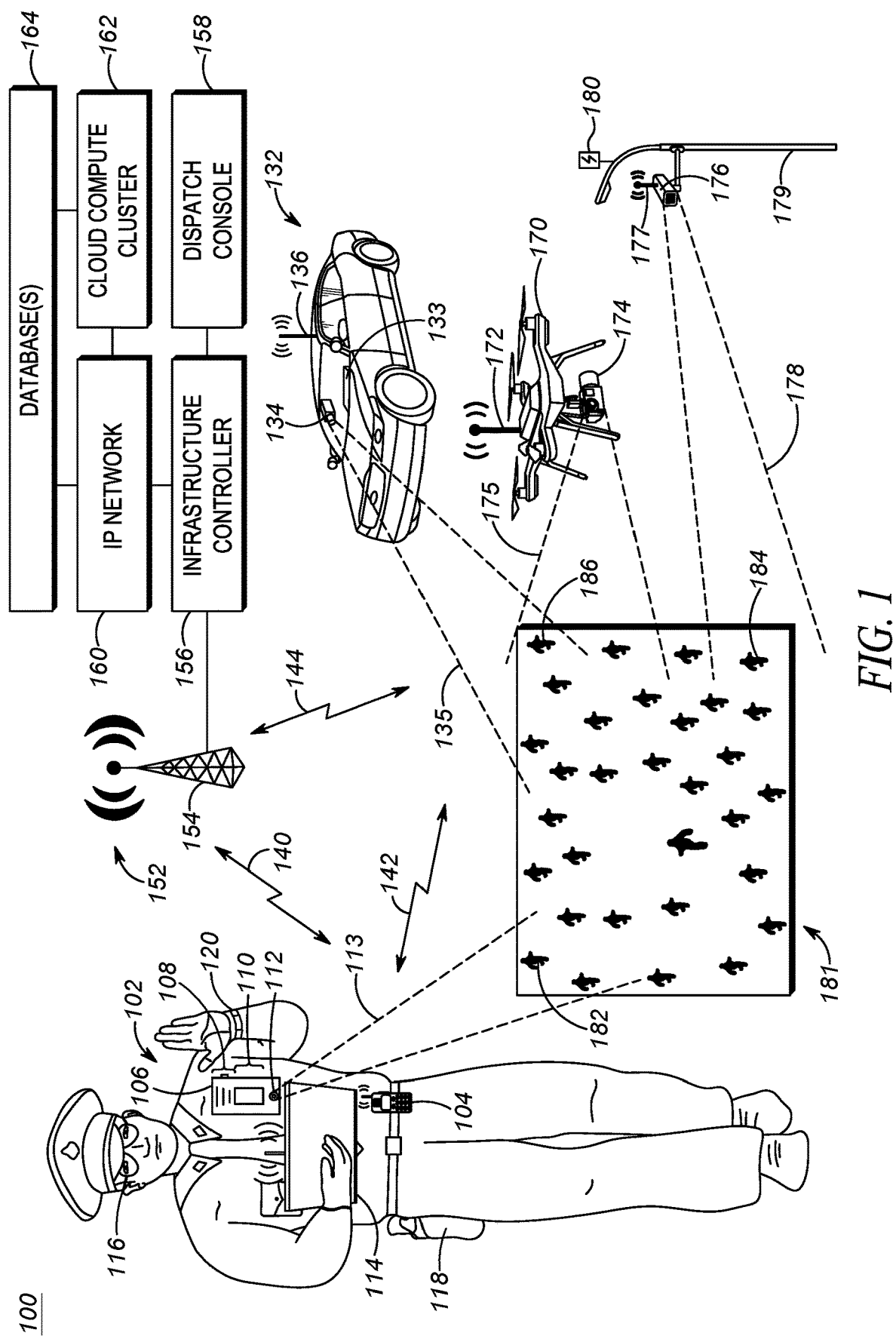
FIG. 1 is a system diagram illustrating a system for operating and training machine learning models, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In light of the foregoing, there exists a need for an improved technical method, device, and system for adaptive training of machine learning models via detected contextual public safety incident timeline entries.

Each of the embodiments will be discussed in more detail below, starting with example communication system and device architectures of the system in which the embodiments may be practiced, followed by an illustration of processing steps for achieving the method, device, and system for an adaptive training of machine learning models via detected contextual public safety incident timeline entries. Further advantages and features consistent with this disclosure will be set forth in the following detailed description, with reference to the figures.

1. COMMUNICATION SYSTEM AND DEVICE STRUCTURES a. Communication System Structure Referring now to the drawings, and in particular FIG. 1, a communication system diagram illustrates a system 100 of devices including a first set of devices that a user 102 (illustrated in FIG. 1 as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (e.g., which may be virtual reality, augmented reality, or mixed reality glasses), sensor-enabled holster 118, and/or biometric sensor wristband 120. Although FIG. 1 illustrates only a single user 102 with a respective first set of devices, in other embodiments, the single user 102 may include additional sets of same or similar devices, and additional users may be present with respective additional sets of same or similar devices. Furthermore, the user 102 is identified and described herein as an 'in-field user' (hereinafter, 'user'), in that the user 102 is in the field (e.g., on the clock and performing some portion of his or her duties) in a professional context, and may have either a specifically assigned current task (e.g., on-assignment) or may be performing a general activity or set of default tasks when no specifically assigned task is available and currently assigned (e.g., not-on-assignment). Sensors attached to the user while in the field are similarly considered in-field sensors.

System 100 may also include a vehicle 132 associated with the user 102 having an integrated mobile communication device 133, an associated vehicular video camera 134, and a coupled vehicular transceiver 136. Although FIG. 1 illustrates only a single vehicle 132 with a respective single vehicular video camera 134 and transceiver 136, in other embodiments, the vehicle 132 may include additional same or similar video cameras and/or transceivers, and additional vehicles may be present with respective additional sets of video cameras and/or transceivers.

System 100 may further include a camera-equipped unmanned mobile vehicle 170 such as a drone. Furthermore, a pole-mounted camera 176 may be positioned on a street light 179, a traffic light, or the like. The system 100 further includes a geographic area 181 within which one or more people, animals, or objects may be present.

Each of the portable radio 104, RSM video capture device 106, laptop 114, vehicle 132, unmanned mobile vehicle 170, and pole-mounted camera 176 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (e.g., in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), hazardous chemical and/or radiological sensors, the RSM video capture device 106, and/or the laptop 114 may communicatively couple.

In order to communicate with and exchange video, audio, and other media and communications with the RSM video capture device 106 and/or the laptop 114, the portable radio 104 may contain one or more physical electronic ports (such as a USB port, an Ethernet port, an audio jack, etc.) for direct electronic coupling with the RSM video capture device 106 or laptop 114. In some embodiments, the portable radio 104 may contain a short-range transmitter (e.g., in comparison to the long-range transmitter such as a LMR or Broadband transmitter) and/or transceiver for wirelessly coupling with the RSM video capture device 106 or laptop 114. The short-range transmitter may be a Bluetooth, Zigbee, or NFC transmitter having a transmit range on the order of 0.01-100 meters, or 0.1-10 meters. In other embodiments, the RSM video capture device 106 and/or the laptop 114 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or directly from one or more other communication devices or the infrastructure RAN. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single communication device to communicate with one or more group members (not shown) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a suspect and the suspect's surroundings, storing the captured image and/or audio data for further analysis or transmitting the captured image and/or audio data as a video and/or audio stream to the portable radio 104 and/or to other communication devices or to the infrastructure RAN directly for further analysis. An RSM remote microphone of the RSM video capture device 106 may be a directional or unidirectional microphone or array of directional or unidirectional microphones that, in the case of directional or arrays of microphones, may be capable of identifying a direction from which a captured sound emanated.

The video camera 112 may be continuously on, may periodically take images at a regular cadence, or may be triggered to begin capturing images and/or video as a result of some other action, such as an emergency button being pushed at the RSM 106 or the mobile radio 104, or the user 102 exiting a vehicle such as vehicle 132, among other possibilities. The video camera 112 may include a CMOS or CCD imager, for example, for digitally capturing images and/or video of a corresponding region of interest, person, crowd, or object of interest. Images and/or video captured at the video camera 112 may be stored and/or processed at the video camera 112 or RSM 106 itself and/or may be transmitted to a separate storage or processing computing device via its transceiver and a direct-mode wireless link 142 and/or infrastructure wireless link(s) 140, 144. For example purposes only, the video camera 112 is illustrated in FIG. 1 as having a narrow field of view 113 as illustrated, but in other examples, may be more narrow or may be much wider, up to and including a 360° field of view.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, an arrest record database application, an outstanding warrant database application, a mapping and/or navigation application, a health information database application, or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

The front and/or rear-facing video cameras at laptop 114 may be continuously on, may periodically take images at a regular cadence, or may be triggered to begin capturing images and/or video as a result of some other action, such as an emergency button being pushed at the RSM 106 or via the mobile radio 104, or the user 102 enabling one or both via a laptop 114 user interface, among other possibilities. The front and/or rear-facing video cameras at laptop 114 may include a CMOS or CCD imager, for example, for digitally capturing images and/or video of a corresponding region of interest, person, crowd, or object of interest. Images and/or video captured at the front and/or rear-facing video cameras at laptop 114 may be stored and/or processed at the laptop 114 itself and/or may be transmitted to a separate storage or processing computing device via its transceiver and a direct-mode wireless link 142 and/or infrastructure wireless link(s) 140, 144.

The smart glasses 116 may include a digital imaging device, an electronic processor, a short-range and/or long-range transceiver device, and/or a projecting device. The digital imaging device at smart glasses 116 may be continuously on, may periodically take images at a regular cadence, or may be triggered to begin capturing images and/or video as a result of some other action, such as an emergency button being pushed at the RSM 106 or the mobile radio 104, or the user 102 exiting a vehicle such as vehicle 132 or the user 102 enabling the camera via a user interface on a stem or other surface of the glasses, among other possibilities. The digital imaging device at smart glasses 116 may include a CMOS or CCD imager, for example, for digitally capturing images and/or video of a corresponding region of interest, person, crowd, or object of interest. Images and/or video captured at the digital imaging device at smart glasses 116 may be stored and/or processed at the smart glasses 116 itself and/or may be transmitted to a separate storage or processing computing device via its transceiver and a direct-mode wireless link 142 and/or infrastructure wireless link(s) 140, 144.

The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In some embodiments, an additional user interface mechanism such as a touch interface or gesture detection mechanism may be provided at the smart glasses 116 that allows the user 102 to interact with the display elements displayed on the smart glasses 116 or modify operation of the digital imaging device. In other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (i.e., supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. In still other embodiments, the weapon itself may include a weapon trigger sensor and/or a weapon discharge sensor that may provide additional trigger activation and/or weapon discharge information to portable radio 104 for further storage and/or transmission to other computer devices via direct mode wireless link 142 and/or infrastructure wireless link(s) 140, 144. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor.

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, or other short-range wireless protocol having a transmission range on the order of meters, tens of meters, or hundreds of meters.

The portable radio 104 and/or RSM video capture device 106 (or any other electronic device in FIG. 1, including each of the sensors described herein, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices directly or via the mobile radio 104, among other possibilities.

The vehicle 132 associated with the user 102 may include the mobile communication device 133, the vehicular video camera 134, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. A microphone (not shown), or an array thereof, may be integrated in the video camera 134 and/or at the mobile communication device 133 (or additionally or alternatively made available at a separate location of the vehicle 132) and communicatively coupled to the mobile communication device 133 and/or vehicular transceiver 136 for capturing audio and storing, processing, and/or transmitting the audio in a same or similar manner to the video as set forth above.

The vehicular video camera 134 attached to the vehicle 132 may be continuously on, may periodically take images at a regular cadence, or may be triggered to begin capturing images and/or video as a result of some other action, such as the vehicle 132 being dispatched to a particular area of interest or the vehicle door being opened or the vehicle light-bar being turned on. The vehicular video camera 134 may include a CMOS or CCD imager, for example, for digitally capturing images and/or video of the corresponding region of interest, person, crowd, or object of interest. Images and/or video captured at the vehicular video camera 134 may be stored and/or processed at the vehicle 132 itself and/or may be transmitted to a separate storage or processing computing device via transceiver 136 and a direct-mode wireless link 142 and/or infrastructure wireless link(s) 140, 144. For example purposes only, the vehicular video camera 134 is illustrated in FIG. 1 as having a narrow field of view 135 as illustrated, but in other examples, may be more narrow or may be much wider, up to and including a 360° field of view.

The vehicle 132 may be a human-operable vehicle, or may be a self-driving vehicle operable under control of mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link).

The vehicle 132 and/or transceiver 136, similar to the portable radio 104 and/or respective receivers, transmitters, or transceivers thereof, may include a location determination device integrated with or separately disposed in the mobile communication device 133 and/or transceiver 136 for determining (and storing and/or transmitting) a location of the vehicle 132 and/or the vehicular video camera 134.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras) and sensors within the VAN and PAN.

The camera-equipped unmanned mobile vehicle 170 may be a camera-equipped flight-capable airborne drone having an electro-mechanical drive element, an imaging camera, and a microprocessor that is capable of taking flight under its own control, under control of a remote operator, or some combination thereof, and taking images and/or video of a region of interest such as geographic area 181 prior to, during, or after flight. The imaging camera 174 attached to the unmanned mobile vehicle 170 may be fixed in its direction (and thus rely upon repositioning of the unmanned mobile vehicle 170 it is attached to for camera positioning) or may include a pan, tilt, zoom motor for independently controlling pan, tilt, and zoom features of the imaging camera 174. The camera-equipped unmanned mobile vehicle 170, while depicted in FIG. 1 as an airborne drone, could additionally or alternatively be a ground-based or water-based unmanned mobile vehicle, among many other possibilities. The imaging camera 174 attached to the unmanned mobile vehicle 170 may be continuously on, may periodically take images at a regular cadence, or may be triggered to begin capturing images and/or video as a result of some other action, such as the unmanned mobile vehicle 170 being dispatched to a particular area of interest or dispatched with instructions to ascertain a crowd or other user in its field of view. The imaging camera 174 may include a CMOS or CCD imager, for example, for digitally capturing images and/or video of the corresponding region of interest, person, crowd, or object of interest. Images and/or video captured at the imaging camera 174 may be stored and/or processed at the unmanned mobile vehicle 170 itself and/or may be transmitted to a separate storage or processing computing device via its transceiver 172 and a direct-mode wireless link 142 and/or infrastructure wireless link(s) 140, 144. For example purposes only, the imaging camera 174 is illustrated in FIG. 1 as having a narrow field of view 175 that includes user 102 as illustrated, but in other examples, may be more narrow or may be much wider, up to and including a 360° field of view.

An additional electronic processor (not shown) may be disposed in the unmanned mobile vehicle 170, in the imaging camera 174, and/or with the transceiver 172 for processing audio and/or video produced by the camera 174 (which may include executing a machine learning model on the captured audio and/or video) and controlling messaging sent and received via the transceiver 172. A microphone (not shown) may be integrated in the imaging camera 174 or made available at a separate location on the unmanned mobile vehicle 170 and communicably coupled to the electronic processor and/or transceiver 172.

The fixed video camera 176 attached to street post 179 may be any imaging device capable of taking still or moving-image captures in a corresponding area of interest, illustrated in FIG. 1 as including a geographic area 181 that includes user 102, but in other embodiments, may include a building entry-way, a bridge, a sidewalk, or any other area of interest. The fixed video camera 176 is fixed in the sense that it cannot physically move itself in any significant direction (e.g., more than one foot or one inch in any horizontal or vertical direction). However, this does not mean that it cannot pan, tilt, or zoom at its fixed location to cover a larger corresponding area of interest than without such pan, tilt, or zoom. The fixed video camera 176 may be continuously on, may periodically take images at a regular cadence, or may be triggered to begin capturing images and/or video as a result of some other action, such as detection of an instruction or command via captured audio or upon receipt of an instruction to do so from another computing device. The fixed video camera 176 may include a CMOS or CCD imager, for example, for digitally capturing images and/or video of a corresponding area of interest. Audio and/or video captured at the fixed video camera 176 may be stored and/or processed at the fixed video camera 176 itself (which may include executing a machine learning model on the captured audio and/or video), and/or may be transmitted to a separate storage or processing device via its transceiver 177 and a direct-mode wireless link 142 and/or infrastructure wireless link(s) 140, 144. While fixed video camera 176 is illustrated in FIG. 1 as affixed to a street light or street pole, in other embodiments, the fixed video camera 176 may be affixed to a building, a stop light, a street sign, or some other structure. For example purposes only, the fixed video camera 176 is illustrated in FIG. 1 as having a narrow field of view 178 as illustrated, but in other examples, may be more narrow or may be much wider, up to and including a 360° field of view.

Also attached to the street post 179 may be additional sensors, such as a shot detection sensor 180 that includes an acoustic sensor for identifying and time-stamping strong impulsive noises, perhaps including an array of acoustic sensors for triangulating a direction and/or location of a detected shot, and perhaps including a visual confirmation capability for visually detecting an infrared flash associated with a gunshot from a barrel of a gun. Other types of shot detection sensors could be used as well or in place of the shot detection sensor 180. Shot detection sensor 180 may rely upon a transmitter and/or transceiver 177 of fixed video camera 176, or may include its own transmitter and/or transceiver for transmitting sensed events to other communications devices via a direct-mode wireless link 142 and/or infrastructure wireless link(s) 140, 144. Shot detection sensor 180 is similarly considered an in-field sensor as it is deployed in a geographic region of interest in which events of interest are to be detected (e.g., co-located) for the purpose of training machine learning models for similarly detecting events in captured video generated via in-field (deployed in desired public or private geographic areas) imaging cameras for detecting corresponding in-field events. In contrast, out-of-field sensors or context events may detect values or context that may still be indicative of a particular in-field event, but such sensors or context are not co-located with the in-field event. For example, later detecting, via context or sensor, an arrest of a suspect that has previously been charged with a similar event in the past relative to a particular charged event. Co-location of the sensors and/or context entry with the event is important as the location of some or all of the sensors and/or context entry are used in identifying imaging cameras that may have captured the event for purposes of improving training of a machine learning model to detect the event in audio and/or video.

The camera-equipped unmanned mobile vehicle 170 and the fixed video camera 176 may each include a location determination device integrated with or separately disposed in the camera-equipped unmanned mobile vehicle 170 or the fixed video camera 176 and/or in respective receivers, transmitters, or transceivers of the camera-equipped unmanned mobile vehicle 170 and the fixed video camera 176 for determining a location of the respective camera-equipped unmanned mobile vehicle 170 and the fixed video camera 176. The location determination device may be, for example, a GPS receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communications devices, including to an imaging camera location database, perhaps stored in databases 164 via infrastructure RAN 152. In other embodiments, and for example when the imaging device is fixed in its location as the fixed video camera 176 is, the location may be provisioned in the fixed video camera 176 (and/or the electronic processor, memory, or transmitter/transceiver/receiver thereof) or may be provisioned in the infrastructure (such as in the imaging camera database at the infrastructure controller 156 or the database(s) 164, such that video and/or audio provided by the fixed video camera 176 and accompanying a unique identifier of the fixed video camera 176 can be cross-referenced with the provisioned location of the fixed video camera 176 stored in the infrastructure). Other possibilities exist as well.

Although the RSM 106, the laptop 114, the vehicle 132, unmanned mobile vehicle 170, and pole-mounted camera 176 are illustrated in FIG. 1 as providing example video cameras and/or microphones for use in capturing audio and/or video streams, other types of cameras and/or microphones could be used as well, including but not limited to, fixed or pivotable video cameras secured to buildings, automated teller machine (ATM) video cameras, or other types of audio and/or video recording devices accessible via a wired or wireless network interface same or similar to that disclosed herein.

Each of the user's 102 portable radio 104, RSM video capture device 106, or laptop 114, and/or the mobile communication device 133 at vehicle 132, may provide an incident timeline entry application and application interface that allows an in-field officer such as user 102 operating the device to enter in-field incident timeline information such as occurrence of a particular observed incident type (robbery, kidnapping, explosion, etc.), incident status (on patrol, arriving at incident, leaving incident scene, etc.), incident information (description of suspect, description of incident scene, etc.), or incident event (arrival of officers or other incident response teams or team members, arrest made, ticket issued, etc.), among other incident-related information for first responders, or retail or enterprise workers or environments. This information may be stored locally and/or may be transmitted to a separate storage or processing computing device via a respective transceiver and a direct-mode wireless link 142 and/or infrastructure wireless link(s) 140, 144.

Because the incident timeline information provides incident-related information personally observed by the user entering the information, and additionally provides geographic location and time vicinity information along with it as described further below, the incident-related information can be treated as high confidence information and used to identify and retrieve available video streams that captured the underlying detectable event(s) mapped from the timeline entry for further use in training one or more associated machine learning models to detect such underlying detectable events.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1, among other possibilities. At least one other terminal, e.g. used in conjunction with the communication devices, may be a fixed terminal, e.g. a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a WLAN technology such as Wi-Fi perhaps operating in accordance with an IEEE 802.11 standard (e.g., 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless system, enables familiar PTT and "instant on" features of traditional half duplex communication devices, but uses communication devices operating over modern broadband telecommunications networks. Using PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol (such as OMA- PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in infrastructure RAN 152 at infrastructure controller 156 or at a separate cloud computing cluster such as cloud compute cluster 162 communicably coupled to controller 156 via internet protocol (IP) network 160, among other possibilities.

The infrastructure RAN 152 is illustrated in FIG. 1 as providing coverage for the portable radio 104, RSM video capture device 106, laptop 114, and vehicle transceiver 136 via a single fixed terminal 154 coupled to a single infrastructure controller 156 (e.g., a radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in the remote cloud compute cluster 162 accessible via the IP network 160 (such as the Internet), may additionally or alternatively operate as a back-end electronic digital assistant, a back-end audio and/or video processing device, machine learning model store, machine learning training module, and/or a storage device consistent with the remainder of this disclosure.

The IP network 160 may comprise one or more routers, switches, LANs, WLANs, WANs, access points, or other network infrastructure, including but not limited to, the public Internet. The cloud compute cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud compute cluster 162 may be geographically co-located or may be separated by inches, meters, or miles, and inter-connected via electronic and/or optical interconnects. Although not shown in FIG. 1, one or more proxy servers or load balancing servers may control which one or more computing devices perform any part or all of the electronic digital assistant service.

Database(s) 164 may be accessible via IP network 160 and/or cloud compute cluster 162, and may include databases such as a long-term video storage database, a historical or forecasted weather database, an offender database perhaps including facial recognition images to match against, a cartographic database of streets and elevations, a traffic database of historical or current traffic conditions, or other types of databases. Databases 164 may further include all or a portion of the databases described herein including those described as being provided at infrastructure controller 156. In some embodiments, the databases 164 may be maintained by third parties (for example, the National Weather Service or a Department of Transportation, respectively). As shown in FIG. 1, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1 are merely examples. In some embodiments, the system 100 additionally or alternatively includes other databases that store different information. In some embodiments, the databases 164 and/or additional or other databases are integrated with, or internal to, the infrastructure controller 156.

The geographic area 181 illustrated in FIG. 1 may be any gathering of people, animals, and/or objects equal to or greater than one, such that some or all of the people, animals, and/or objects are within the fields of view of one or more of the various cameras noted above. Illustrated in FIG. 1 are three people in particular, including a first person 182 that, for example purposes, is within a field of view 113 of the RSM video capture device 106, a second person 184 that, for example purposes is within a field of view 178 of pole-mounted camera 176, and a third person 186 that, for example purposes, is within a field of view 175 of imaging camera 174 attached to the unmanned mobile vehicle 170. User 102 is also considered to be within the field of view of both the pole-mounted camera 176 and the imaging camera 174 attached to the unmanned mobile vehicle 170.

Finally, although FIG. 1 describes a communication system 100 generally as a public safety communication system that includes a user 102 generally described as a police officer and a vehicle 132 generally described as a police cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (e.g., a shuttle or self-balancing scooter). In other embodiments, the communication system 100 may additionally or alternatively be a warehouse communication system including a user 102 that may be an employee of a warehouse and a vehicle 132 that may be a vehicle for use by the user 102 in furtherance of the employee's retail duties (e.g., a forklift). In still further embodiments, the communication system 100 may additionally or alternatively be a private security communication system including a user 102 that may be an employee of a private security company and a vehicle 132 that may be a vehicle for use by the user 102 in furtherance of the private security employee's duties (e.g., a private security vehicle or motorcycle). In even further embodiments, the communication system 100 may additionally or alternatively be a medical communication system including a user 102 that may be a doctor or nurse of a hospital and a vehicle 132 that may be a vehicle for use by the user 102 in furtherance of the doctor or nurse's duties (e.g., a medical gurney or ambulance). In still another example embodiment, the communication system 100 may additionally or alternatively be a heavy machinery communication system including a user 102 that may be a miner, driller, or extractor at a mine, oil field, or precious metal or gem field and a vehicle 132 that may be a vehicle for use by the user 102 in furtherance of the miner, driller, or extractor's duties (e.g., an excavator, bulldozer, crane, front loader). As one other example, the communication system 100 may additionally or alternatively be a transportation logistics communication system including a user 102 that may be a bus driver or semi-truck driver at a school or transportation company and a vehicle 132 that may be a vehicle for use by the user 102 in furtherance of the driver's duties. Devices and sensors noted above, including fixed camera 176 and camera-equipped unmanned mobile vehicle 170 may provide same or similar functions and services in such alternative environments. Other possibilities exist as well.

b. Device Structure

Figure 2:
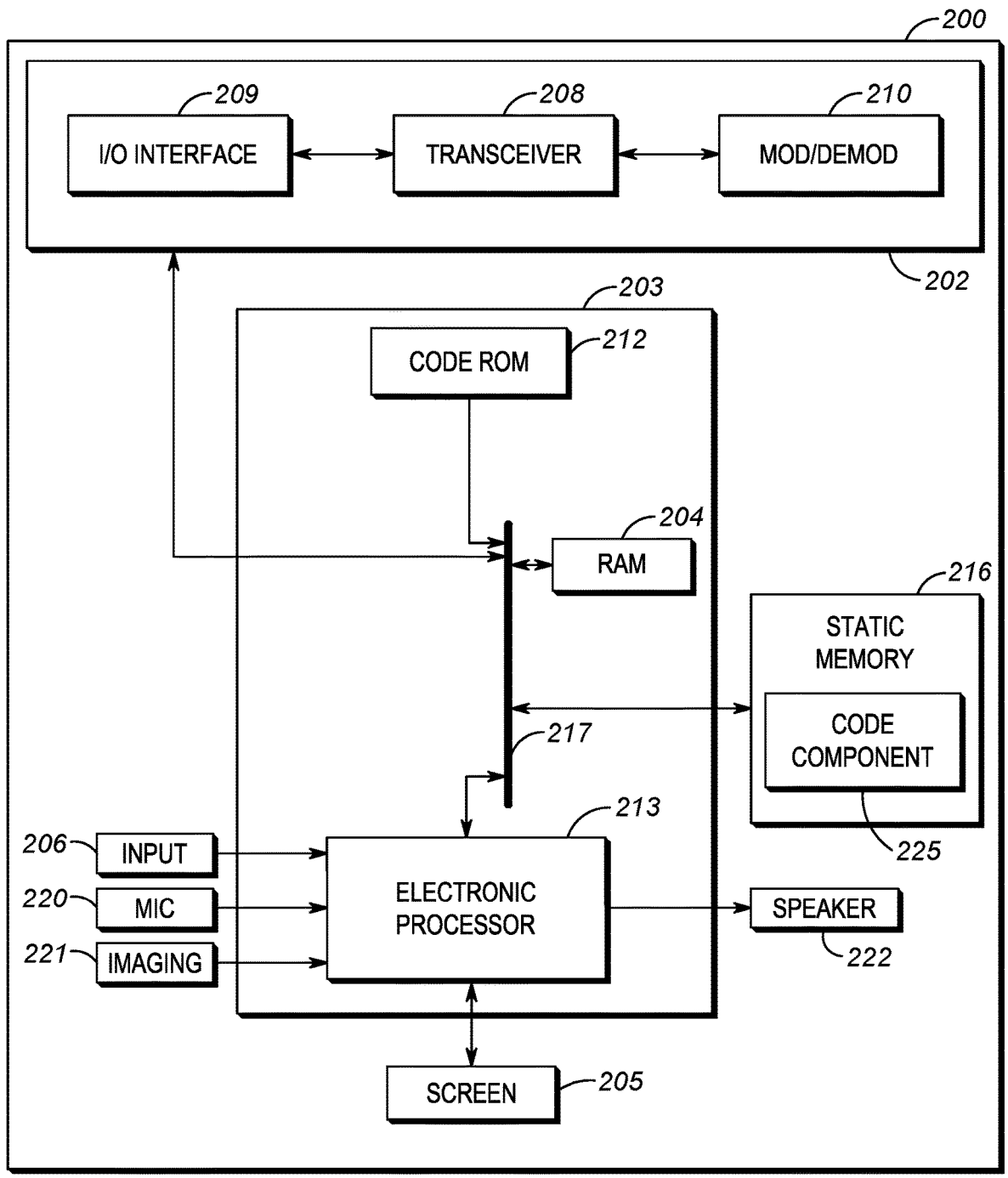
FIG. 2 is a device diagram showing a device structure of an electronic computing device for operating and training machine learning models, in accordance with some embodiments.

FIG. 2 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud compute cluster 162, fixed camera 176, camera-equipped unmanned mobile vehicle 170, or some other communication device not illustrated in FIG. 1, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 2 represents the communication devices described above with respect to FIG. 1, depending on the type of the communication device, the communication device 200 may include fewer or additional components in configurations different from that illustrated in FIG. 2. For example, in some embodiments, communication device 200 acting as the infrastructure controller 156 may not include one or more of the screen 205, input device 206, microphone 220, imaging device 221, and speaker 222. As another example, in some embodiments, the communication device 200 acting as the portable radio 104 or the RSM video capture device 106 may further include a location determination device (for example, a global positioning system (GPS) receiver) as explained above. Other combinations are possible as well.

As shown in FIG. 2, communication device 200 includes a communications unit 202 coupled to a common data and address bus 217 of a processing unit 203. The communication device 200 may also include one or more input devices (e.g., keypad, pointing device, touch-sensitive surface, etc.) 206 and an electronic display screen 205 (which, in some embodiments, may be a touch screen and thus also act as an input device 206), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the input device 206, the microphone 220, the imaging device 221, and/or the speaker 222. Static memory 216 may store operating code 225 for the electronic processor 213 that, when executed, performs one or more of the steps set forth in FIG. 4 and accompanying text.

In some embodiments, static memory 216 may also store, permanently or temporarily, a context to detectable event mapping that maps sets of sensor information values to events having a predetermined threshold confidence of occurring when the sets of the sensor information values are detected, an event to machine learning model mapping that maps each of a plurality of events to corresponding one or more machine learning training modules or machine learning models by a unique identifier associated with each machine learning training module or machine learning model, and/or an incident timeline information to detectable event mapping that maps incident timeline entries to events enabled for further video capture and training of an associated machine learning model.

The static memory 216 may comprise, for example, a hard-disk drive (HDD), an optical disk drive such as a compact disk (CD) drive or digital versatile disk (DVD) drive, a solid state drive (SSD), a flash memory drive, or a tape drive, and the like.

2. PROCESSES FOR ADAPTIVE TRAINING OF MACHINE LEARNING MODELS VIA DETECTED IN-FIELD CONTEXTUAL INCIDENT TIMELINE EVENT ENTRY AND ASSOCIATED LOCATED AND RETRIEVED DIGITAL AUDIO AND/OR VIDEO IMAGING

In some embodiments, an individual component and/or a combination of individual components of the system 100 may be referred to as an electronic computing device that implements the process for adaptive training of machine learning models via detected in-field contextual incident timeline event entry and associated located and retrieved digital audio and/or video imaging.

For example, the electronic computing device may be a single electronic processor (for example, the electronic processor 213 of the portable radio 104). In other embodiments, the electronic computing device includes multiple electronic processors distributed remotely from each other. For example, the electronic computing device may be implemented on a combination of at least two of the electronic processor 213 of the portable radio 104, the electronic processor 213 of the infrastructure controller 156, and the electronic processor 213 of a back-end device cloud compute cluster 162 accessible via the IP network 160.

Figure 3:
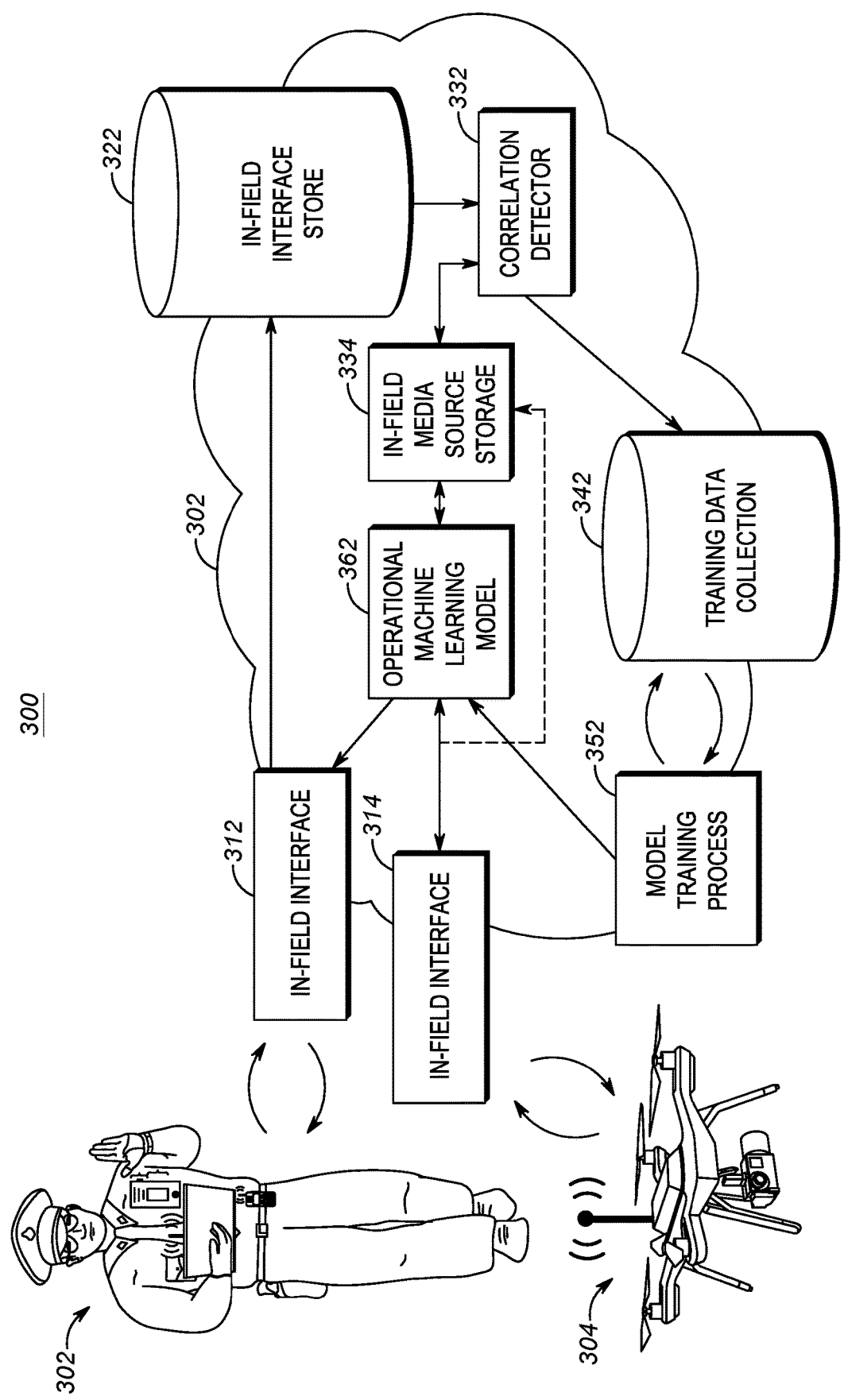
FIG. 3 illustrates a functional diagram flowchart setting forth different functional units or modules for operating and training machine learning models relative to FIGS. 1 and/or 2, in accordance with some embodiments.

Turning now to FIG. 3, a functional diagram 300 illustrates various processes and/or functional modules that may implement, via the electronic computing device, the process for adaptive training of machine learning models via detected in-field contextual incident timeline event entry and associated located and retrieved digital audio and/or video imaging. In-field incident timeline applications 302 may be any application running on any mobile (personal or vehicular) computing device for entering time-stamped and location enabled incident-related information and that may be used to provide an indication of an event that has occurred with a threshold minimum confidence. For example, in-field incident timeline applications 302 may include an incident timeline application running at any of the mobile computing devices set forth above with respect to FIG. 1, which may include radios, laptops, vehicular mobile computing devices, or other types of mobile computing devices. In-field interface 312 may be a communications interface, such as communications unit 202 of communication device 200, for receiving in-field incident timeline information entered into such in-field incident timeline applications. In-field incident timeline information received at in-field interface 312 may be stored at in-field interface store 322, which may be a static, non-volatile memory such as static memory 216 of communication device 200. In-field incident timeline information may include in-field incident timeline information values reflecting an observed occurrence of a particular observed incident type (robbery, kidnapping, explosion, etc.), an entered updated incident status (on patrol, arriving at incident, leaving incident scene, etc.), an observed and entered incident description (description of suspect, description of incident scene, etc.), or an observed and entered incident event (arrival of officers or other incident response teams or team members, arrest made, ticket issued for violation of a law, rule, or ordinance, etc.), among other incident-related information for first responders, or similar information for retail or enterprise workers or environments.

Correlation detector 332 may be a process executed at the electronic computing device, for example the electronic processor 213 of FIG. 2, for identifying correlations between in-field incident timeline information stored at in-field interface store 322 for identifying that a particular event has occurred with a minimum threshold of confidence. Correlation detector 332 may execute continuously, periodically, or based on some request, trigger, or demand internal to the electronic computing device or external to the electronic computing device and provided to the electronic computing device via a communications interface including, for example, in-field interface(s) 312, 314 or some other communication interface. Correlation detector 332 may access a data store, such as in-field interface store 322, containing a context to detectable event mapping that maps in-field incident timeline information values to events having a threshold confidence of occurring when one or more in-field incident timeline information values are detected. For example, the mapping may include a mapping as set forth in Table I for a vehicle speeding event having a minimum confidence level of 85%.

TABLE I

FIRST EXAMPLE CONTEXT TO DETECTABLE EVENT MAPPING

| In-field Incident Timeline Information Value | Confidence Level Add |
|---|---|
| 1: Officer Initiated Traffic Stop | 45% |
| 2: Speeding Ticket Issued | 45% |
| 3: Speeding Warning Issued | 45% |

As set forth in Table I above, various entered in-field incident timeline information values may contribute to an overall confidence level that an underlying event has occurred, in this case, that a speeding infraction has occurred. While Table I sets forth an example where two out of three in-field incident timeline information values must be detected to reach a minimum threshold confidence level that the associated underlying action has occurred, in other examples, more than two or less than two incident timeline information values may be required to be met. Furthermore, each of the incident timeline information values set forth in Table I and in the mapping more generally may emanate from a single in-field incident timeline application within a threshold time period, or from across multiple in-field incident timeline applications within a threshold geographic vicinity of one another and within a threshold time period (i.e., time vicinity) of one another.

Once sufficient in-field incident timeline information values are detected such that their associated 'confidence level add' values added together reaches above the threshold for the corresponding particular event, the correlation detector 332 may then take further action for training a machine learning model associated with that underlying particular event. As set forth in Table I, the correlation detector may detect that an in-field incident timeline application has received a first entry (i.e., information value) indicating an officer initiated traffic stop and a second entry indicating that a speeding ticket has been issued, which added together would raise the confidence level of a speeding event occurring over the associated minimum confidence level of 85% (which may be stored in the mapping in Table I as well, or may be stored elsewhere and linked to the mapping in some way).

In some embodiments, the correlation detector may verify that the first and second in-field incident timeline information values in this case, if not coming from a same in-field incident timeline application, were generated by in-field incident timeline applications within a threshold geographic vicinity of one another and within a threshold time vicinity of one another by polling the in-field incident timeline applications that generated the values only after the threshold confidence level of the associated event is determined to be met, while in other embodiments, location and time capture information may be stored in the mapping as well and directly used by the correlation detector 332 to filter out unrelated in-field incident timeline information values prior to calculating whether minimum confidence levels have been met for detecting associated events. The geographic vicinity of the in-field incident timeline applications and the time vicinity of the entered in-field incident timeline information values required to determine that they are correlated may vary based on the type of event. For example, for a gunshot event, the geographic vicinity (or limits of co-location) required may be on the order of tens to several hundred feet while the time vicinity may be on the order of single or double-digit seconds, while for another type of event such as a man down event, the geographic vicinity required may be on the order of tens of feet while the time vicinity may be on the order of tens or hundreds of seconds.

In some embodiments, the "confidence level add" value may further vary based on confidence-impacting characteristics of the in-field incident timeline application or characteristics of the user entering information into the in-field incident timeline application that provided the in-field incident timeline information values. For example, in-field incident timeline applications associated with or being executed on devices or vehicles carried or operated by an officer assigned by a dispatcher to an incident related to the particular incident to which the in-field incident timeline information values are associated may raise the confidence level add value several percentage points higher (or lower) or may qualify the in-field incident timeline information values to be further used for identifying mapped particular incidents (e.g., having their associated "confidence level add" added together to meet the minimum threshold level). For example, in-field incident timeline information values indicating a vehicular speeding event consistent with Table I above and captured via an in-field incident timeline application associated with an officer already assigned to patrol speeding along a particular beat or dispatch area may be considered more reliable, and thus have an increased "confidence level add" value or be qualified to be added to determine if a threshold level is met. In other embodiments, a rank or job description associated with the officer may cause some variation of the "confidence level add" value or may qualify use the "confidence level add" value of associated in-field incident timeline information values for meeting the minimum threshold level. For example, in-field incident timeline information values from in-field incident timeline applications associated with a commander or police chief may have a higher modified "confidence level add" than in-field incident timeline information values from in-field incident timeline applications received from a traffic control officer. Other examples are possible as well.

Other types of mappings are possible as well. For example, the mapping may be a mapping as set forth in Table II for a same gunshot event as set forth in Table I.

TABLE II

SECOND EXAMPLE CONTEXT TO DETECTABLE EVENT MAPPING

In-field Incident Timeline Entry Information Value

1: Officer Initiated Traffic Stop
2: Speeding Ticket Issued

In this example of Table II, and counter to Table I, each of the incident timeline information values must be present within same or similar geographic and time vicinities as set forth above for the event to be determined to have occurred with a sufficient threshold certainty. Other types of mappings are possible as well.

Once correlation detector 332 detects a match between incident timeline information values consistent with the incident timeline information entry to underlying event mapping and identifies a particular event that is determined to have occurred with a commensurate threshold level of certainty, the correlation detector 332 determines a geographic location associated with the entry of the first context information and a time period relative to the time associated with the entry of the first context information. The geographic location may be the actual location of the computing device executing the incident timeline application in which the in-field incident timeline information values (or a highest priority or an average thereof if more than one incident timeline application at more than one computing device were entered), or may vary dependent upon the incident timeline information values and corresponding underlying particular event. For example, in the example set forth in Tables I and/or II, the geographic location associated with the vehicular speeding event may be a location just prior to the location at which the entry of the in-field incident timeline information values were detected (e.g., by a set amount of time or distance), or may be a location just prior to the location at which the entry of the in-field incident timeline information values were detected at which the officer was detected going at a peak speed (e.g., assumedly chasing the speeding vehicle). Other possibilities exist as well.

The time period relative to the time associated with the entry of the first context information may be the actual time in the past that the computing device executing the incident timeline application received the in-field incident timeline information values (or a highest priority or an average thereof if more than one incident timeline application at more than one computing device were entered), may be a current time (e.g., in those cases where the in-field incident timeline information values indicates that the particular event is continuing to occur), or may vary dependent upon the incident timeline information values and corresponding underlying particular event. For example, in the example set forth in Tables I and/or II, the time period relative to the time associated with the entry of the first context information may be a period of time just prior to the time at which the in-field incident timeline information values were entered, or may be a time prior to the time in-field incident timeline information values at which the officer was detected going at a peak speed. Other possibilities exist as well.

Once the geographic location and time period are determined, the correlation detector 332 responsively accesses an imaging camera location database and identifies, via the database, one or more imaging cameras that has (i.e., currently) or had (i.e., in the past) a field of view including the determined geographic location of the particular event within the determined time period of the particular event. The imaging camera location database may be stored at the in-field interface store 322, or elsewhere local or remote to the electronic computing device, as long as it is communicably accessible to the correlation detector 332.

The imaging camera location database may include geographic locations of each static or mobile imaging camera being tracked via the imaging camera location database, and may include pre-provisioned locations (e.g., such as a GPS location, a street address, polar coordinates, cross streets, in-building room number, or other information capable of conveying an absolute or relative location, to the sensor-provided location data, of the imaging cameras in the database) or may provide periodic or continuously updated and time-stamped locations as reported by the imaging cameras themselves (e.g., such as imaging camera 174 of camera-equipped unmanned mobile vehicle 170) or another computing device communicably coupled to the imaging camera (e.g., such as by mobile radio 104 communicably coupled to imaging camera 112 of video RSM 106). Also included in the imaging camera location database may be field-of-view information for each imaging camera identifying field-of-view parameters useful in determining a geographic vicinity within which the imaging camera may be capable of capturing events via audio and/or video capture. Such parameters may include a sensitivity of a microphone, a measured level of background noise, an RSSI level, a bit error rate, a focal length of an optical imaging element, a size of an imaging sensor included in the imaging camera, a geographic location of the imaging camera, an altitude of the imaging camera, an orientation of the imaging camera (perhaps as a function of time for periodically moving PTZ security cameras or for mobile body worn cameras), distance or depth information determined via a laser or depth imager attached to the imaging camera, and (for pan, tilt, zoom cameras (PTZ)), current pan, tilt, and zoom parameters (and potentially available PTZ capabilities as well).

Once the correlation detector identifies, via the imaging camera database, one or more imaging cameras having a field-of-view that includes the determined geographic location associated with entry of the first context information corresponding to the particular event during the determined time period of the particular event, the correlation detector may then retrieve, or cause some other device or process to retrieve, a current audio and/or video transport stream from the identified one or more imaging cameras, or a stored copy of a historically captured audio and/or video stream or streams produced by the identified one or more imaging cameras for a period of time associated with the particular event. For example, historically captured audio and/or video streams may be stored in a digital evidence management system (DEMS) such as in-field media source 334 storage accessible via a local wired or wireless area network on a same premises as the electronic computing device or at a remote premises location such as in databases(s) 164 in a cloud-based storage system. A request to the DEMS store with the identity of the imaging camera and an identity of the determined time period of interest may be provided to the DEMS store, and in response, a copy of the relevant audio and/or video stream may be received. In some embodiments, live video transport streams may be provided by the same in-field interface 312 over which incident timeline information values were provided, and may be stored, at least temporarily, at in-field interface store 322. Video streams retrieved at step 412 may have varying qualities and frame rates, from 1 frame/5 seconds to 160 frames/second, and may be encoded using varying video encoding protocols, such as MPEG-2, MPEG-4, WMV, HVC, or others. Audio may be encoded in accordance with the same protocol, or may be encoded via a different protocol and packaged together with the video into an audio/video container file. Other possibilities exist as well.

After audio and/or video streams from imaging cameras identified above are received, the correlation detector 332 may cause the received audio and/or video streams to be provided to one or more corresponding machine learning training modules corresponding to one or more machine learning models for detecting the particular event in audio and/or video streams. A machine learning training module may take several different forms, but in any event, is a combination of hardware and software for using the received audio and/or video streams to modify an existing machine learning model (e.g., neural network, linear regression, decision tree, support vector machine, etc.) of a corresponding machine learning model as a function of the received additional training data in the form of the received audio and/or video streams, or to create a new machine learning model (e.g., neural network, linear regression, decision tree, support vector machine, etc.) for a corresponding machine learning model that includes prior training data and the received additional training data in the form of the received audio and/or video streams.

In one example, training audio and/or video data may be stored in particular identified locations of training data collection 342 and linked to particular operational machine learning models executing at process 362. Accordingly, the correlation detector 332 may provide the received audio and/or video streams to one or more corresponding machine learning training modules by providing them to corresponding areas of the training data collection 342 associated with training data for the corresponding machine learning model. For example, a vehicle speeding event detected commensurate with the examples set forth in Table I and/or II above, and associated with a vehicular speeding event machine learning model executing at process 362, may have a corresponding audio and/or video training data set stored at a particular location in training data collection 342, and correlation detector 332 may cause the received audio and/or video streams retrieved perhaps from in-field media source 334 to be queued and stored into the particular location in training data collection 342. As a result, the next time a model training process corresponding to the vehicle speeding event machine learning model at process 362 is performed by model training process 352 (perhaps periodically on a set schedule, or perhaps on demand after receiving a request or notification from correlation detector 332 after it queues the additional training audio and/or video stream at training data collection 342) may cause a new or modified neural network (or other machine learning model) to be created using the newly added received audio and/or video streams retrieved from in-field media source 334. The newly formed neural network could then be provided by the model training process 352 for implementation at operational machine learning model process 362, which may then be used to apply the new or modified machine learning model to in-the-field video analytics for video feeds provided by in-field video imaging cameras 304 or stored at in-field media source storage 334, among other possibilities.

For example, selected imaging cameras 304 may include the pole-mounted camera 176 of FIG. 1 that may provide captured video back to operational machine learning model process 362 via in-field interface 314 or may include the video camera 112 of the RSM video capture device 106 of FIG. 1 that may then provide captured video back to operational machine learning model process 362 via in-field interface 314 or back to in-field media source storage 334. The operational machine learning model process 362 may then use the new or modified machine learning model to detect particular events occurring or having occurred within the respective fields of view 178 and 113. Accordingly, in-field incident timeline information values help create more accurate neural networks (or other machine learning models) that may then be reused for more accurately analyzing in-field audio and/or video and aid in more accurately detecting respective events in provided and/or stored audio and/or video streams, for example, occurring throughout the system 100 and/or throughout the geographic area 181, via fixed and mobile imaging cameras.

In other embodiments, operational machine learning model process 362 may distribute the newly formed or modified machine learning model to selected imaging cameras 304 via in-field interface 314 for execution at edge devices in the field. For example, selected imaging cameras 304 may include the pole-mounted camera 176 of FIG. 1 that may then use the newly formed or modified machine learning model to detect the particular event occurring within its field of view 178, or may include the video camera 112 of the RSM video capture device 106 of FIG. 1 that may then use the newly formed or modified machine learning model to detect the particular event occurring within its field of view 113. As a result, entered in-field incident timeline information values help create more accurate neural networks (or other machine learning model) that may then be re-distributed back out to the field and aid in better detecting events, for example, occurring through the geographic area 181 via fixed and mobile imaging cameras. Other possibilities exist as well.

In another example, model training process 352 may implement an application programming interface (API) for accessing features of a training process for creating or modifying a corresponding machine learning training model at process 362. Accordingly, the correlation detector 332 may provide the received audio and/or video streams to one or more corresponding machine learning training modules by providing them to the corresponding machine learning training API that corresponds to the machine learning model associated with the particular event. For example, a speeding event detected commensurate with the examples set forth in Table I and/or II above, and associated with a speeding event machine learning model executing at process 362, may have a corresponding API at model training process 352, and correlation detector 332 may cause the received audio and/or video streams retrieved perhaps from in-field media source 334 to be provided to the corresponding speeding event API by making a corresponding function call with a copy of the received audio and/or video streams or a link thereto, perhaps bypassing the training data collection 342 altogether and relying upon the API to handle, process, and/or store the received audio and/or video streams in accordance with its rules. Other possibilities exist as well.

In the case neural network machine learning models, the machine learning neural networks operating at process 362 may be one of convolutional neural networks and recurrent neural networks. Example convolutional neural network algorithms used at model training process 352 and operational machine learning model process 362 may include AlexNet, ResNet, or GoogLeNet, among other possibilities. Example recurrent neural network algorithms used at model training process 352 and operational machine learning model process 362 may include a Hopfield bidirectional associative memory network, a long short-term memory network, or a recurrent multilayer perceptron network, among other possibilities.

Figure 4:
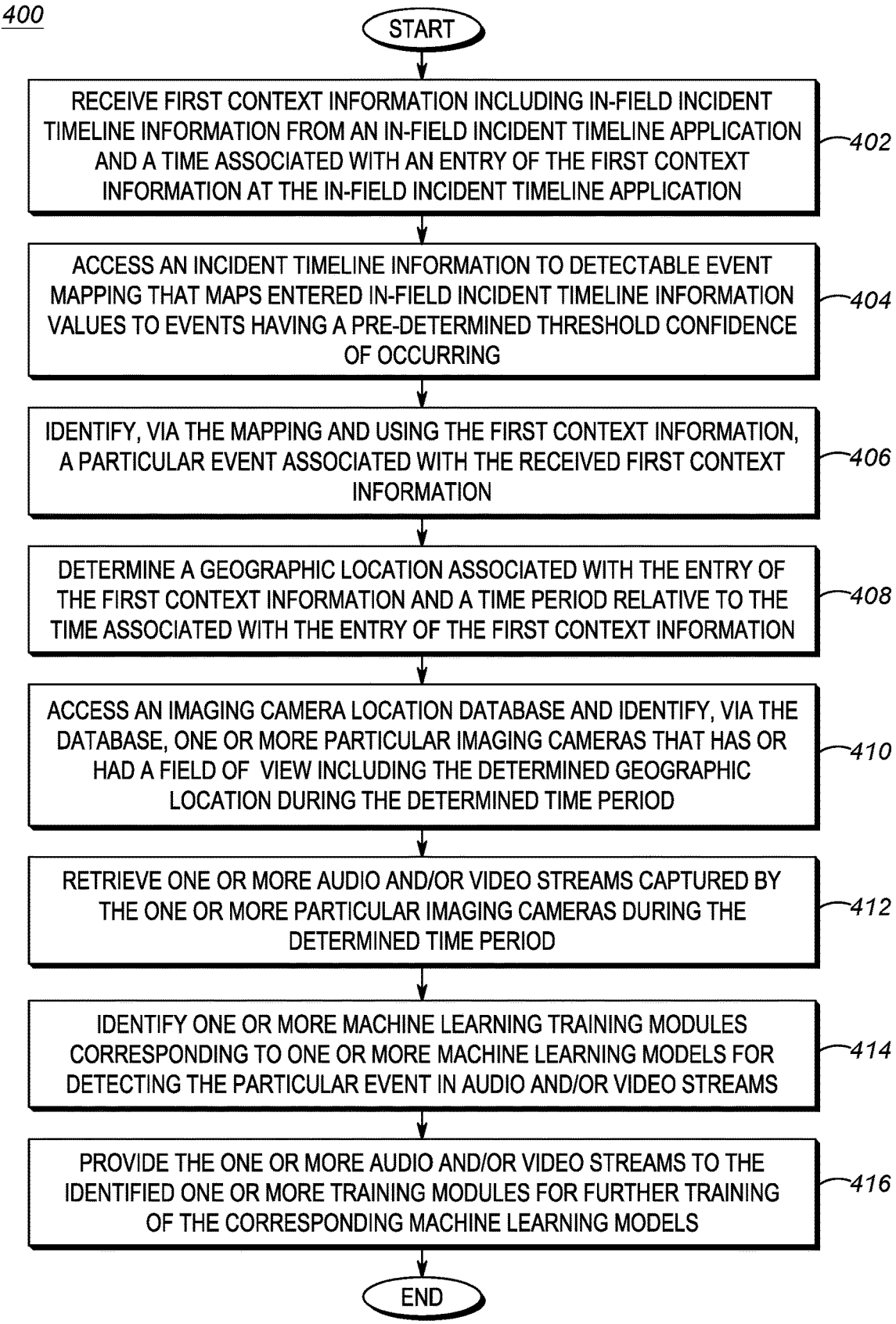
FIG. 4 illustrates a flowchart setting forth a set of process steps for operating and training machine learning models, in accordance with some embodiments.

FIG. 4 sets forth a process 400 executable at an electronic computing device such as the electronic computing device as described earlier, and which is described here as independent of, but which may be read together with, the functional diagram 300. While a particular order of processing steps, message receptions, and/or message transmissions is indicated in FIG. 4 for exemplary purposes, timing and ordering of such steps, receptions, and transmissions may vary where appropriate without negating the purpose and advantages of the examples set forth in detail throughout the remainder of this disclosure.

Process 400 begins at step 402 where the electronic computing device receives first context information including in-field incident timeline information from one or more in-field incident timeline applications and a time associated with an entry of the first context information. In addition to the examples already set forth above with respect to FIG. 3, the in-field incident timeline information may include a driving while impaired ticket issuance, an unlawful open possession of a weapon ticket issuance, entry of a new incident occurrence having a particular incident type (such as robbery, theft, abduction, kidnapping, assault, battery, arson, trespassing, hijacking, or public nuisance), or entry of a closed incident indication. In some embodiments, the incident type may include an indication of whether the incident was an observed incident (e.g., the user entering the incident information observed the particular event occur at or near his or her current location) or is a reported incident (e.g., the user entering the incident is hearing of the incident second hand). In some embodiments, only entered observed incident timeline information (e.g., specifically identified via entry into the in-field incident timeline application as an observed incident information entry) may be processed in accordance with process 400 as they may be associated with a higher confidence level, while in other embodiments, entered reported incidents (e.g., specifically identified via entry into the in-field incident timeline application as a reported incident) may be processed in accordance with process 400 as well, perhaps if accompanied by a secondary entered indication of confidence in the reported incident and an entered time at which the incident occurred in the past or accompanied by sensor information to confirm the occurrence of the reported event, among other possibilities.

Figure 5A:
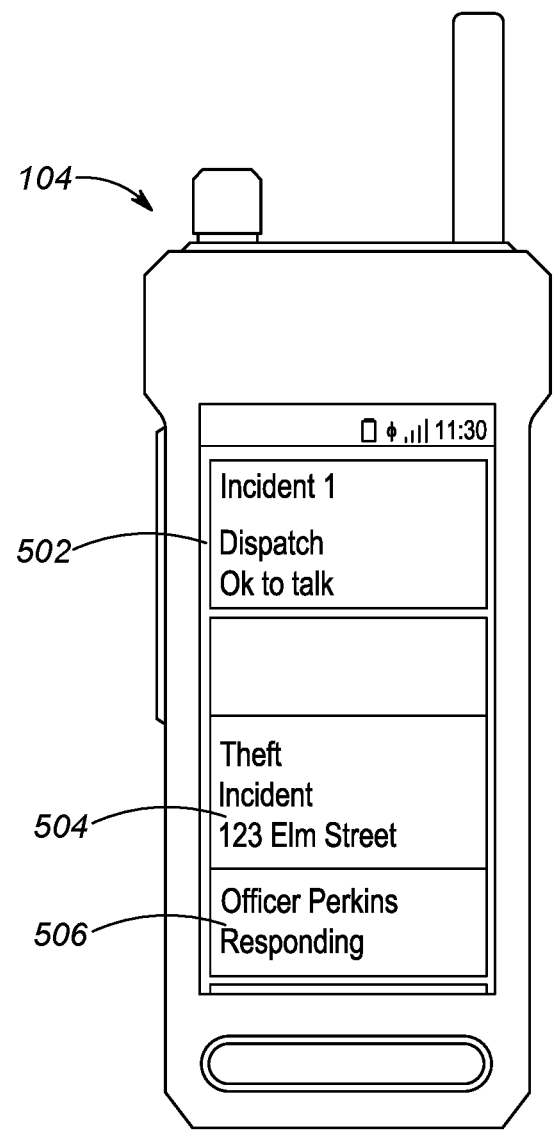
FIGS. 5A and 5B are user interface diagrams setting forth example user interfaces for in-field incident timeline entries, in accordance with some embodiments.
Figure 5B:
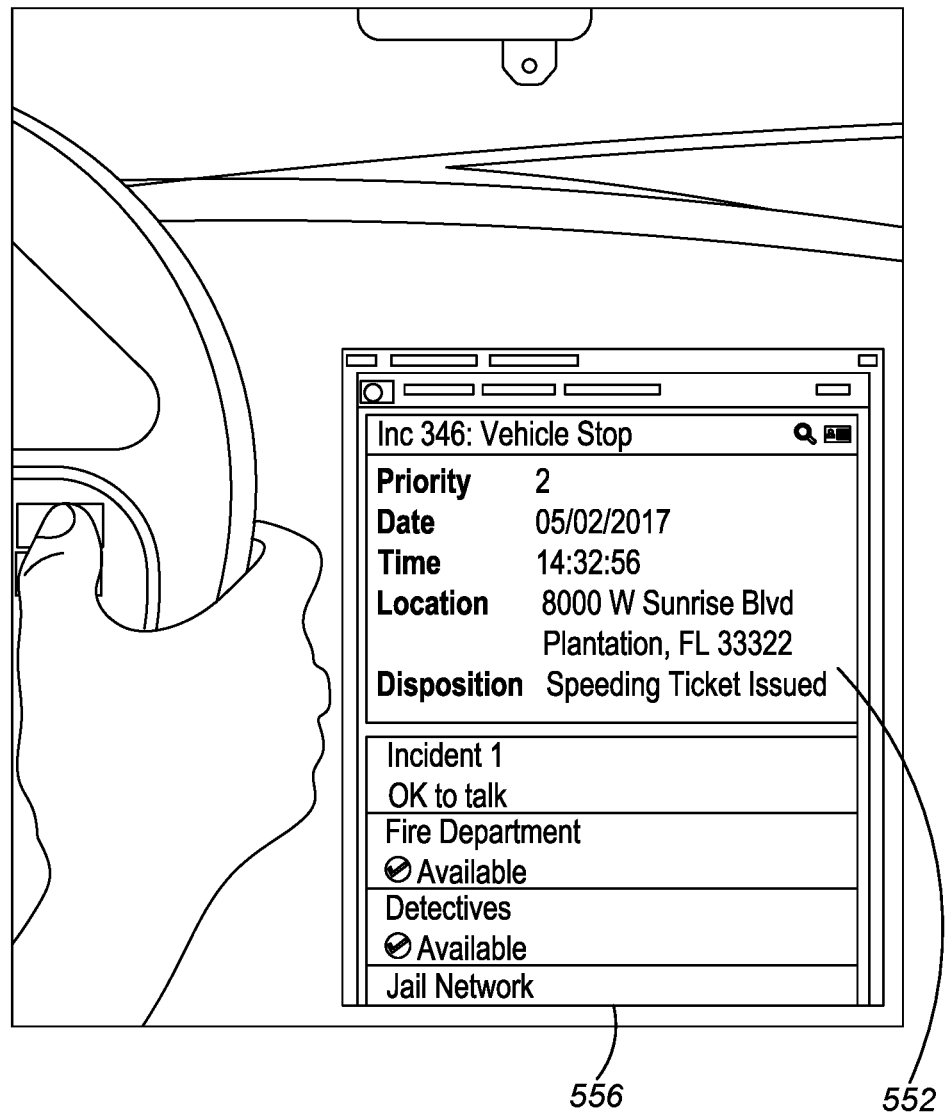

FIGS. 5A and 5B set forth example in-field incident timeline applications and application interfaces that may be used at any mobile computing device, such as portable radio 104, laptop 114, or mobile communication device 133 at vehicle 133 for entering time-stamped and location enabled in-field incident timeline information values and that may be used to provide an indication of a particular event that has occurred with a threshold minimum confidence. FIG. 5A in particular provides an example in-field incident timeline application and application interface that may be implemented at portable radio 104 of FIG. 1. In the example of FIG. 5A, the user 102 enters, via an on-screen keyboard (not shown) input interface or via a voice input interface, that he or she is responding to an observed incident (a theft) at 123 Elm Street (the officer's current location). As shown in FIG. 5A, a PTT talk application window 502 displays a current Incident 1 talkgroup that the portable radio 104 is set to use, an in-field incident timeline application window 504 displays the text entered or voice-recognized by the user entering the type of incident observed as a "theft incident," and an officer status application window 506 displaying a current status of the user 102 as responding to the "theft incident." The portable radio 104 may then transmit the entered in-field incident timeline information to an electronic computing device such as infrastructure controller 156 or cloud compute cluster 162 of FIG. 1 for processing commensurate with process 400 of FIG. 4.

FIG. 5B in particular provides a second example in-field incident timeline application and application interface that may be implemented at mobile computing device 133 of vehicle 132 of FIG. 1. In the example of FIG. 5B, the user 102 sitting in the vehicle 132 may enter into the in-field incident timeline application, via an on-screen keyboard (not shown) input interface or via a voice input interface, in-field incident timeline information values reflecting that he or she is has stopped a vehicle at the time and location indicated, and that a speeding ticket has been issued, which may then be indicated in the in-field incident timeline application user interface 552. In addition, a PTT talk application window

556 may display a current Incident 1 talkgroup that the mobile computing device 133 is set to use. After entry, the portable radio 104 may then transmit the entered in-field incident timeline information to an electronic computing device such as infrastructure controller 156 or cloud compute cluster 162 of FIG. 1 for processing commensurate with process 400 of FIG. 4.

Returning to FIG. 4, at step 404, the electronic computing device accesses a context to detectable event mapping that maps one or more in-field incident timeline information values to events having a predetermined threshold confidence of occurring when the one or more in-field incident timeline information values are detected. In some embodiments, the mapping may contain a separate field indicating whether each particular mapping is enabled for further video capture and training of corresponding machine learning models. Accordingly, the mapping may contain some mappings that cause further steps of process 400 to be executed (e.g., are set to enabled for further video capture and training) and some mappings that do not cause further steps of process 400 to be executed (e.g., are set to disabled for further video capture and training). An administrator such as a dispatcher at dispatch console 158 of FIG. 1 or a chief information officer or technologist associated with creating and updating machine learning models for an organization using them in the field may determine which mappings to enable and which to disable, and make corresponding changes to the mapping on a daily, weekly, monthly, or yearly basis, among other possibilities.

In addition to the examples set forth with respect to FIG. 3 above, the context to detectable event mapping may map a driving while impaired ticket issuance in-field incident timeline information value to a driving while impaired event, an unlawful open possession of a weapon ticket issuance in-field incident timeline information value to an unlawful open possession of a weapon event, or a new observed incident occurrence entry of a robbery, theft, abduction, kidnap, assault, battery, or hijacking in-field incident timeline information value to a corresponding robbery, theft, abduction, kidnap, assault, battery, or hijacking event.

Other types of in-field incident timeline information and in-field incident timeline information value(s) to event mappings in the public safety realm, and other types of in-field incident timeline information and in-field incident timeline information value(s) to event mappings events in the enterprise and consumer space are possible as well.

At step 406, the electronic computing device identifies, via the context to event mapping, and using the first context information, a particular event associated with the received first context information for further video capture and training of an associated machine learning model. In addition to the examples set forth with respect to FIG. 3 above, the particular event may be identified as a driving while impaired event, an unlawful open possession of a weapon event, or one of a robbery, theft, abduction, kidnap, assault, battery, or hijacking event consistent with the description set forth above with respect to step 404. Other types of events in the public safety realm, and other types of events in the enterprise and consumer space are possible as well.

At step 408, the electronic computing device determines a geographic location associated with the entry of the one or more in-field incident timeline information values and determines a time period relative to the time associated with the entry of the one or more in-field incident timeline information values. As set forth earlier, the time period relative to the time associated with the entry of the first context information may be the actual time (i.e., a single point in time, with or without pre and post buffer times added) in the past that the computing device executing the incident timeline application received the in-field incident timeline information values (or a highest priority or an average thereof if more than one incident timeline application at more than one computing device were entered), may be a time window (i.e., not a single point in time, but still with or without pre and post buffer times added to the time window) entirely in the past or extending from the current time into the past that may or may not include the single or averaged point in time the computing device(s) executing the incident timeline application(s) received the in-field incident timeline information values, may be a current time (e.g., in those cases where the in-field incident timeline information values indicates that the particular event is continuing to occur and can be currently captured), or may vary from any one or more of the above dependent upon the incident timeline information values and corresponding underlying particular event.

In addition to the examples set forth with respect to FIG. 3 above, determining a geographic location associated with the one or more in-field incident timeline information value(s) may include receiving a geographic location of a first responder (such as user 102 of FIG. 1) carrying a computing device executing a corresponding in-field incident timeline application via which the in-field incident timeline information value(s) are originally entered, receiving a geographic location of a vehicle (such as vehicle 132 of FIG. 1) in which a mobile computing device executing a corresponding in-field incident timeline application via which the in-field incident timeline information value(s) are originally entered, receiving geographic locations of one or more mobile computing devices, users, or vehicles associated with corresponding in-field incident timeline applications via which the in-field incident timeline information values are originally entered and using a highest priority or geographic sum of all of the received locations as the determined geographic location at step 408. Other possibilities exist as well.

At step 410, the electronic computing device accesses an imaging camera location database and identifies, via the database, one or more particular imaging cameras that has or had a field of view including the determined geographic location during the determined time period. As set forth with respect to the examples of FIG. 3 above, the imaging cameras in the imaging camera database are in-field cameras that may be fixed (such as a light-pole camera or ATM camera) or mobile (such as a body worn camera or a drone-attached camera). The imaging cameras may thus be associated with a particular event (e.g., in the case of a body worn camera worn by an officer involved in the particular event) or unassociated with the particular event (e.g., in the case of a light-pole camera or ATM camera that just happens to be in the right location to capture the particular event). And as set forth in the examples of FIG. 3, the imaging camera location database or some other location may maintain static, current, or historical time-stamped historical location information for each imaging camera, static, current, or time-stamped historical field of view information, which may be compared to the determined geographic location and determined time period from step 408 to determine if the imaging cameras likely (i.e., with a threshold minimum confidence) captured video of a particular event that may be used to automatically train machine learning models associated with the particular event.

In embodiments where a plurality of imaging cameras are identified via the imaging camera database, the electronic computing device may select all of the available imaging cameras independent of capture parameters, may select only a single imaging camera having a closest proximity to the particular event or a highest quality imaging parameters (e.g., highest resolution, widest field of view, highest frame rate, etc.) or some varied combination or calculation between the two, or may select all of those imaging cameras meeting a minimum threshold level quality and/or proximity parameters (which may vary based on the underlying event or machine learning model, such that machine learning models for identifying minute features such as facial features may have higher minimum threshold levels of quality while machine learning models for identifying broader features such as large objects may have lower minimum threshold levels of quality), among other possibilities.

At step 412, the electronic computing device retrieves one or more audio and/or video streams captured by the one or more particular imaging cameras during the determined time period. In addition to the examples set forth with respect to FIG. 3 above, retrieving the one or more audio and/or video streams captured by the one or more particular imaging cameras during the time associated with the capture of the first context information may further include additionally retrieving the one or more audio and/or video streams captured by the one or more particular imaging cameras during an additional prior buffer time occurring before the time associated with the capture of the first context information and during an additional post buffer time occurring after the time associated with the capture of the first context information. For example, the additional prior and post buffer times may be the same or different, and may be in the range of 5-180 seconds, such as 30 seconds, prior to and after the time associated with the capture of the first context information. If the determined time period from step 408 is a single point in time in the past, the prior and post buffer times may be determined relative to that single point in time, while if the determined time period from step 408 is a time window in the past, the prior buffer may be determined relative to an earliest time of the time window while the post buffer may be determined relative to a latest time of the time window. If the determined time period from step 408 includes a current time, only a pre buffer time period may be determined and not a post buffer time period. The additional contextual audio and/or video capture during the pre and post buffers may aid a particular machine learning model in identifying contextual situations leading up to a particular event, or typically occurring after a particular event, among other possibilities.

At step 414, the electronic computing device identifies one or more machine learning training modules corresponding to one or more machine learning models for detecting the particular event in audio and/or video streams. As set forth in the examples set forth in FIG. 3 above, identifying one or more machine learning training modules corresponding to one or more machine learning models may include identifying a particular training data collection queue for storing additional training audio and/or video, including the retrieved one or more audio and/or video streams of step 412, for use in further training (modifying or creating a new neural network) a corresponding machine learning model, or may include identifying a particular API of a machine learning training process and calling the API to re-train the corresponding machine learning model using the provided additional training audio and/or video (e.g., directly provided to the API, or whose location may be provided to the API in the API call). Accordingly, each of the one or more machine learning training modules may be a periodically executed re-training of the machine learning model via a stored collection of training data, and/or may be an on-demand re-training of the machine learning model via a stored or provided modified collection of training data. Other possibilities exist as well.

In some embodiments, and independent of the examples set forth in FIG. 3, identifying the one or more machine learning training modules corresponding to the one or more machine learning models for detecting the particular event in audio and/or video streams comprises accessing an event to machine learning model mapping that maps each of a plurality of events (including the particular event identified at step 406) to corresponding one or more machine learning training modules by a unique (perhaps alphanumeric) identifier, URL, network or storage path, API name, or other identifier associated with each machine learning training module.

At step 416, the electronic computing device provides the one or more audio and/or video streams to the identified one or more machine learning training modules for training the corresponding machine learning models using the unique identifier, URL, network or storage path, API name, or other identifier from step 414. As set forth in the example of FIG. 3 above, providing the one or more audio and/or video streams to the identified one or more machine learning training modules may include storing, uploading, or copying the retrieved one or more audio and/or video streams of step 412 to a training data storage queue associated with (e.g., accessible to) a machine learning training process for re-training a machine learning model associated with detecting the particular event in an audio and/or video stream, or may include providing the retrieved one or more audio and/or video streams themselves, or links thereto, to an API implementing a machine learning training process for re-training a machine learning model associated with detecting the particular event. The newly created or modified machine learning model may then be employed for improved electronic and automatic detection of the particular event in subsequently-generated in-the-field audio and/or video streams at edge devices provided the newly created or modified machine learning model or at infrastructure computing devices provided the newly created or modified machine learning model and provided in-the-field audio and/or video streams (live or previously stored).

In some embodiments, the machine learning model for detecting the particular event may operate on a combined audio/video stream, and therefore, the same machine learning training module may be provided the combined audio/video stream at step 416 of process 400 above. In other embodiments, separate machine learning models for detecting the same particular event may operate separately on an audio portion of a captured audio/video stream and on a video portion of a captured audio/video stream, and therefore, separate machine learning training modules may be identified at step 414 for the same particular event (one for the audio stream and one for the video stream), and separate audio and video streams from the retrieved audio/video streams provided to respective machine learning training modules at step 416.

Furthermore, and in some embodiments after step 416 is completed and a new or modified neural network is formed based on the additional training data, the electronic computing device may cause the newly created or modified neural network to be tested against a predefined set of pre-screened and human-classified training audio and/or video(s) to ensure that the newly created or modified neural network is verified to properly recognize the associated particular event against which the neural network is designed to detect. If the newly created or modified neural network fails against the pre-screened and human-classified training audio and/or video(s), the newly created or modified neural network may be removed and the old neural network restored or the training process may be re-run on a training data set with the retrieved one or more audio and/or video streams from step 412 removed. In some embodiments, and perhaps when the newly created or modified neural network succeeds against the pre-screened and human-classified training audio and/or video(s), the audio and/or video retrieved at step 412 may then be added to the predefined set of pre-screened and human-classified training audio and/or videos (which may now become a predefined set of pre-screened and human and machine learning model classified training audio and/or videos) to verify correct operation of further new or modified neural networks created via future iterations of process 400.

Still further, and in some embodiments, the first context information may additionally include in-field sensor information from a plurality of in-field (non-video) sensors and a second time or times associated with a capture of in-field sensor information by respective in-field sensors. The electronic computing device may then use the in-field sensor information and second time or times to validate the received in-field incident timeline information at step 402 or thereafter but prior to providing the one or more audio and/or video streams to the identified one or more machine learning training modules at step 416 in order to further improve the confidence that the particular event is captured in the retrieved one or more audio and/or video streams.

3. CONCLUSION

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method at an electronic computing device for adaptive training of machine learning models via detected incident timeline entry and associated retrieved digital audio and/or video imaging, the method comprising:

receiving, at the electronic computing device, first context information including one or more entered incident timeline information values reflecting incident-related information observed by a user and manually entered into a mobile computing device associated with the user, from an incident timeline application of the mobile computing device, and a time associated with an entry of the first context information;

accessing, by the electronic computing device, an incident timeline information to detectable event type mapping that maps incident timeline information values to event types having a pre-determined threshold confidence of occurring when the incident timeline information values are present;

identifying, by the electronic computing device, via the incident timeline information to detectable event type mapping using the first context information, a particular event of a particular event type;

determining, by the electronic computing device, a geographic location associated with the entry of the first context information and a time period relative to the time associated with the entry of the first context information;

accessing, by the electronic computing device, an imaging camera location database and identifying, via the imaging camera location database, one or more particular imaging cameras that has or had a field of view including the determined geographic location during the determined time period;

subsequently retrieving, by the electronic computing device, one or more audio and/or video streams captured by the one or more particular imaging cameras during the determined time period;

identifying, by the electronic computing device, one or more machine learning training modules corresponding to one or more machine learning models for future automated detecting of the particular event type in audio and/or video streams; and providing, by the electronic computing device, the retrieved one or more audio and/or video streams to the identified one or more machine learning training modules for further training of corresponding machine learning models for future automated detecting of the particular event type.

2. The method of claim 1, wherein at least a first particular imaging camera of the one or more particular imaging cameras is a body worn camera of theft user assigned to or responding to the particular event.

3. The method of claim 1, wherein at least a first particular imaging camera of the one or more particular imaging cameras is a fixed camera unassociated with the particular event.

4. The method of claim 1, wherein the first context information further comprises sensor information and a second time associated with capture of the sensor information, the electronic computing device using the sensor information and the second time to validate the received incident timeline information values reflecting the incident-related information input as observed by the user prior to providing the one or more audio and/or video streams to the identified one or more machine learning training modules for further training of the corresponding machine learning models.

5. The method of claim 1, wherein determining the geographic location associated with entry of the first context information comprises receiving a global positioning system (GPS) coordinate information from a mobile computing device executing the incident timeline application and using the GPS coordinate information as the geographic location; and wherein the mobile computing device executing the incident timeline application is one of a portable radio and a mobile radio associated with the user.

6. The method of claim 1, wherein the identified one or more particular imaging cameras include respective audio capture devices and the retrieved one or more audio and/or video streams include one or more corresponding audio streams, the method further comprising:

identifying, by the electronic computing device, one or more second machine learning training modules corresponding to one or more second machine learning models for detecting the particular event type in audio streams; and providing, by the electronic computing device, the one or more corresponding audio streams to the identified one or more second machine learning training modules for further training of the corresponding second machine learning models for future automated detecting of the particular event type.

7. The method of claim 1, wherein the time associated with the entry of the first context information is a discrete point in time or is a particular window of time over which the first context information was entered or captured; and wherein retrieving the one or more audio and/or video streams captured by the one or more particular imaging cameras during the time associated with the entry of the first context information further comprises additionally retrieving the one or more audio and/or video streams captured by the one or more particular imaging cameras during an additional prior buffer time occurring before the time associated with the entry of the first context information and during an additional post buffer time occurring after the time associated with the entry of the first context information.

8. The method of claim 1, wherein each of the one or more machine learning training modules is a periodically executed re-training of the machine learning model via a stored collection of training data, and providing the one or more audio and/or video streams to the identified one or more machine learning training modules for further training of the corresponding machine learning models comprises adding the one or more audio and/or video streams to a corresponding stored collection of training data for the corresponding machine learning model.

9. The method of claim 1, wherein each of the one or more machine learning training modules is an on-demand executed re-training of the machine learning model via a stored collection of training data, and providing the one or more audio and/or video streams to the identified one or more machine learning training modules for further training of the corresponding machine learning models comprises adding the one or more audio and/or video streams to a corresponding stored collection of training data to create a modified collection of training data for the corresponding machine learning model and transmitting an instruction to initiate re-training of the corresponding machine learning model using the modified collection of training data.

10. The method of claim 1, wherein identifying the one or more machine learning training modules corresponding to the one or more machine learning models for detecting the particular event type in audio and/or video streams comprises accessing an event type to machine learning model mapping that maps each of a plurality of event types to corresponding one or more machine learning training modules by a unique identifier associated with each machine learning training module.

11. The method of claim 1, wherein retrieving the one or more audio and/or video streams captured by the one or more particular imaging cameras comprises accessing a digital evidence management system and retrieving the one or more audio and/or video streams using a time parameter determined as a function of the time associated with capture of the first context information and a camera parameter determined via the imaging camera location database.

12. The method of claim 1, wherein retrieving the one or more audio and/or video streams captured by the one or more particular imaging cameras comprises accessing one or more live video transport streams at network locations for the one or more particular imaging cameras as retrieved from the imaging camera location database and locally storing the one or more audio and/or video streams.

13. The method of claim 1, wherein the incident-related information observed by the user and manually entered into the mobile computing device associated with the user includes one selected from an observed robbery incident type, an observed kidnapping incident type, an observed explosion incident type, an observed on patrol incident status, an observed arriving at incident incident status, an observed leaving incident incident status, an observed description of a suspect, an observed description of an incident scene, an observed arrival of other officers, an observed arrest made, and an observed ticket issued.

14. The method of claim 1, wherein the user is a first officer, and wherein the incident timeline information values include a detected entry of an infraction issuance for violation of a law, rule, or ordinance by theft first officer involved in the particular event at a mobile computing device associated with the first officer, the particular event type is an underlying action observed by the first officer and in violation of the law, rule, or ordinance for which the violation is issued, and the identified one or more machine learning models is a machine learning model for detecting the underlying action in violation of the law, rule, or ordinance in an audio and/or video stream.

15. The method of claim 14, wherein the underlying action is vehicular speeding above a speed limit set by the law, rule, or ordinance, the infraction issuance is issuance of a speeding ticket, and the identified one or more machine learning models is a machine learning model for detecting vehicular speeding in an audio and/or video stream.

16. The method of claim 14, wherein the underlying action is driving while impaired set by the law, rule, or ordinance, the infraction issuance is issuance of a driving while impaired ticket, and the identified one or more machine learning models is a machine learning model for detecting a vehicle driven while impaired in an audio and/or video stream.

17. The method of claim 14, wherein the underlying action is unlawful open possession of a weapon set by the law, rule, or ordinance, the infraction issuance is issuance of an unlawful open possession of a weapon ticket, and the identified one or more machine learning models is a machine learning model for detecting an unlawful open possession of a weapon in an audio and/or video stream.

18. The method of claim 1, wherein the user is a first officer, and wherein the incident timeline information values include a detected entry of a new incident having a first particular indicated incident type observed by the first officer and manually entered by the first officer currently involved in responding to the new incident at a mobile computing device associated with the first officer, and the identified one or more machine learning models is a machine learning model for detecting an occurrence of incidents having the first particular indicated incident type in an audio and/or video stream.

19. The method of claim 18, wherein the first particular indicated incident type is one of a robbery, theft, abduction, kidnap, assault, battery, and hijacking.

20. An electronic computing device implementing an adaptive training of machine learning models via detected contextual incident timeline entry and associated retrieved digital audio and/or video imaging, the electronic computing device comprising:
  a memory storing non-transitory computer-readable instructions;
  a transceiver; and
  one or more processors configured to, in response to executing the non-transitory computer-readable instructions, perform a first set of functions comprising:
    receive, via the transceiver, first context information including one or more entered incident timeline information values reflecting incident-related information observed by a user and manually entered into a mobile computing device associated with the user, from an incident timeline application of the mobile computing device, and a time associated with an entry of the first context information;
    access an incident timeline information to detectable event type mapping that maps incident timeline information values to event types having a predetermined threshold confidence of occurring when the incident timeline information values are present;
    identify, via the incident timeline information to detectable event type mapping using the first context information, a particular event of a particular event type;
    determine a geographic location associated with the entry of the first context information and a time period relative to the time associated with the entry of the first context information;
    access an imaging camera location database and identify, via the imaging camera location database, one or more particular imaging cameras that has or had a field of view including the determined geographic location during the determined time period;
    subsequently retrieve one or more audio and/or video streams captured by the one or more particular imaging cameras during the determined time period;
    identify one or more machine learning training modules corresponding to one or more machine learning models for future automated detecting of the particular event type in audio and/or video streams; and
    provide the retrieved one or more audio and/or video streams to the identified one or more machine learning training modules for further training of corresponding machine learning models for future automated detecting of the particular event type.

\* \* \* \* \*